March 11, 1941.  W. L. MARSHALL  2,234,477
UNDERREAMING TOOL
Filed June 20, 1938  2 Sheets-Sheet 1
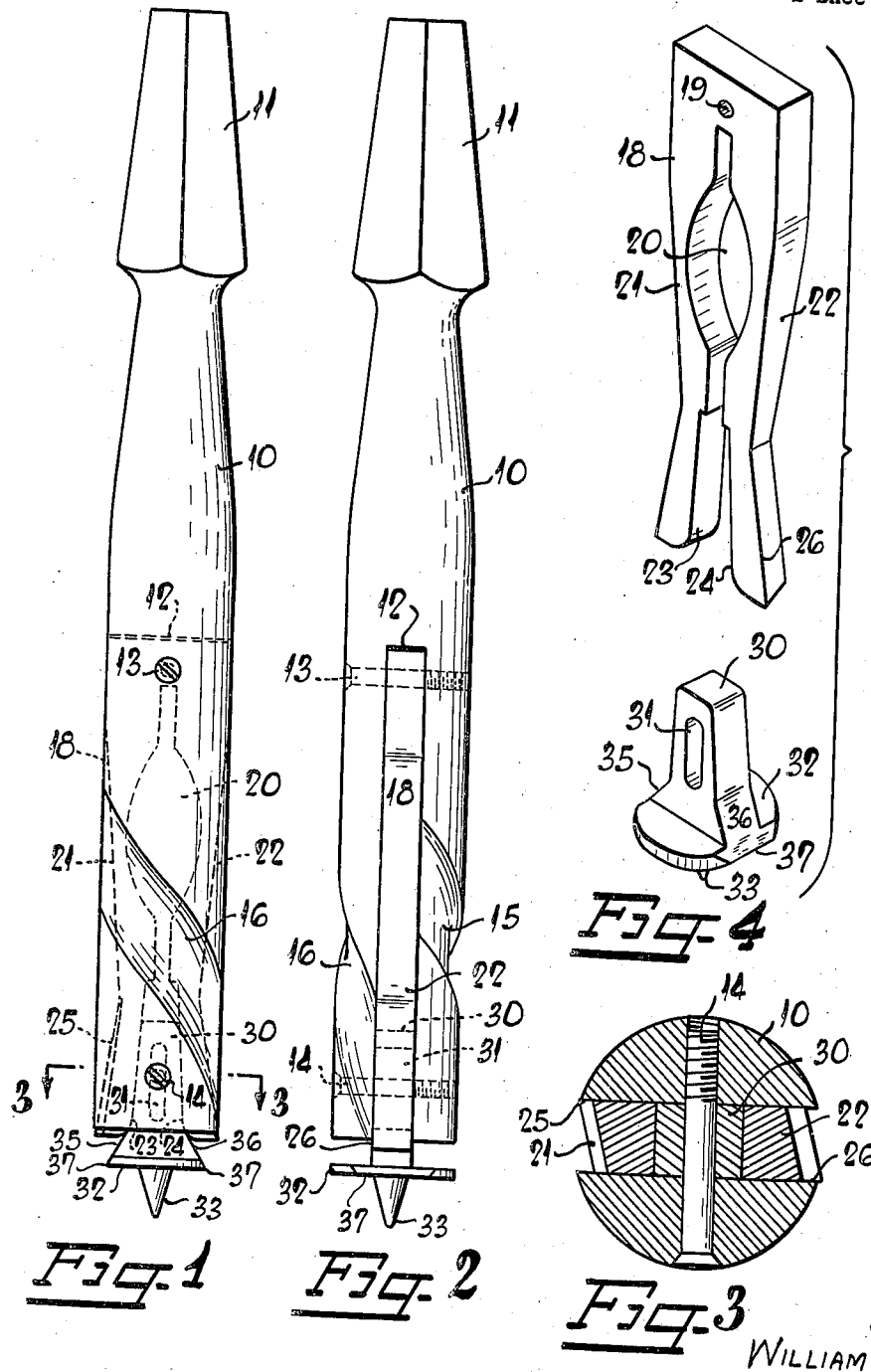
Inventor:
WILLIAM L. MARSHALL
By
Attorney March 11, 1941. W. L. MARSHALL 2,234,477
UNDERREAMING TOOL
Filed June 20, 1938 2 Sheets-Sheet 2
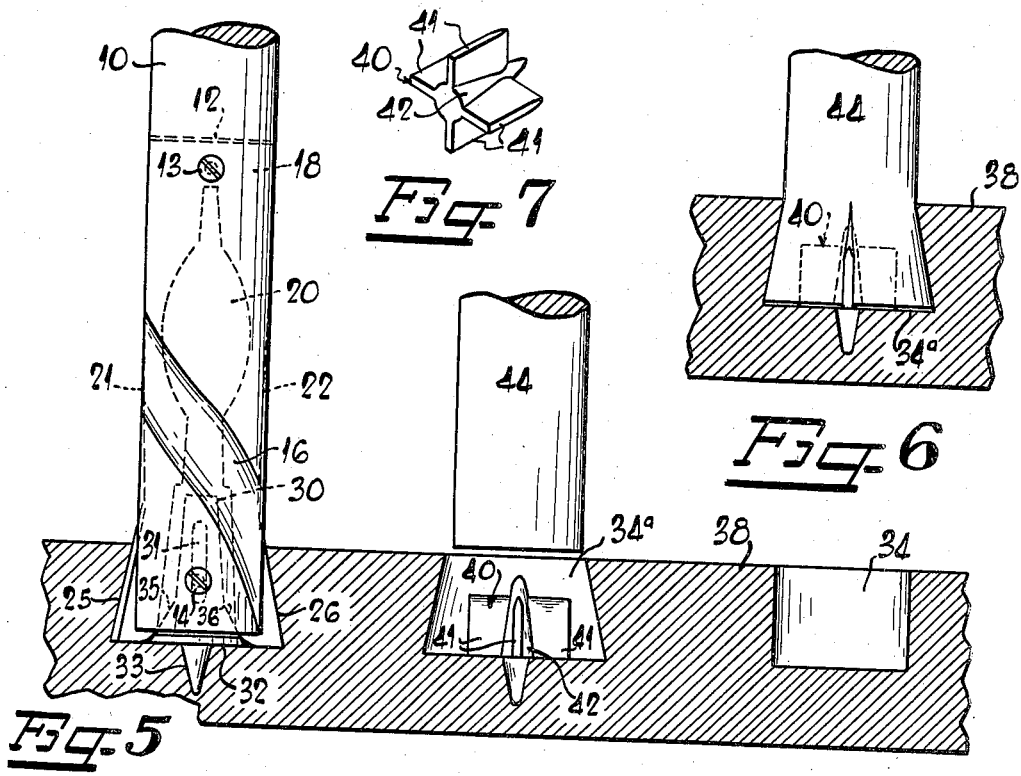
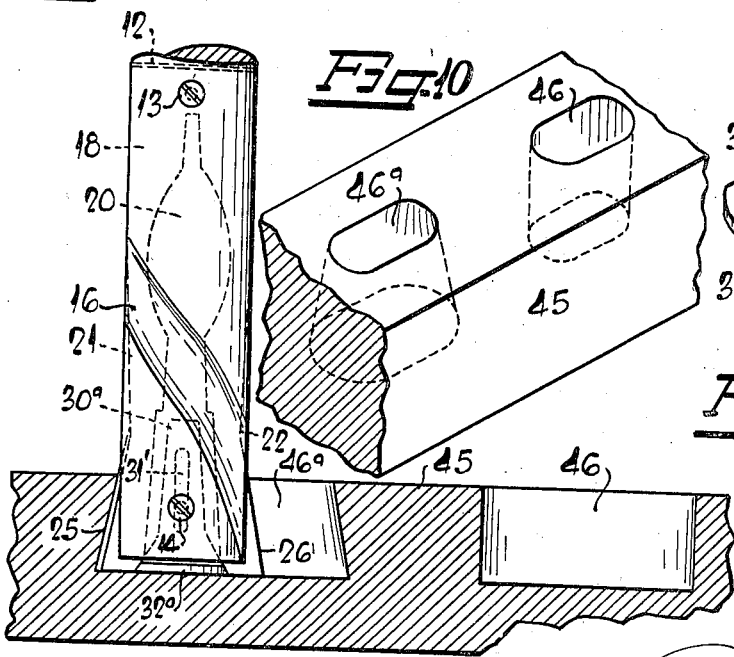
Inventor
WILLIAM L. MARSHALL
By
Attorney Patented Mar. 11, 1941

2,234,477

UNITED STATES PATENT OFFICE 2,234,477

UNDERREAMING TOOL

William L. Marshall, Albemarle, N. C., assignor of one-half to Crayon C. Efird, Albemarle, N. C.

Application June 20, 1938, Serial No. 214,748

1 Claim. (Cl. 145—124)

This invention relates to a boring or reaming tool and more especially to a suitable boring tool for forming cavities in a piece of material which are broader at their innermost points than at their outermost points, so that when a rung or other connecting member is inserted therein and driven into a suitable wedge disposed in the bottom of the cavity, the end of the rung or other piece of material will be spread to fill up the enlarged cavity and prevent separation of the two pieces.

It is an object of this invention to provide a boring tool having an expansible bit which is adapted to be inserted in a previously bored hole. When pressure is applied to the boring tool, the bit will be expanded and cause the innermost or deepest portion of the hole to be enlarged and thereby forming a cavity which is broader at its bottom than at its exterior.

It is another object of this invention to provide an expansible bit which is expansible by longitudinal pressure applied thereto, so that the bit can be placed in a previously bored hole to undercut or enlarge the deeper portion of the hole to an overall width which is greater than the width of the entrance portion of the hole.

Some of the objects of the invention having been stated, other objects will appear as the description proceeds when taken in connection with the accompanying drawings, in which—

Figure 1 is an elevation of my boring tool;

Figure 2 is another elevation looking at the right-hand side of Figure 1;

Figure 3 is a transverse sectional view taken along the line 3—3 in Figure 1;

Figure 4 is an exploded isometric view of the expansible boring member and the expanding wedge associated therewith;

Figure 5 is a view showing the tool in expanded position and disposed in a hole of a structural member as the hole is being reamed by my improved tool and also showing a hole prior to reaming, and also showing a reamed hole with a suitable wedge disposed therein ready for the reception of the end of a rung or other connecting member;

Figure 6 is a view of a joint effected in accordance with the teachings of my invention;

Figure 7 is a perspective view of a wedge used in making the joint;

Figure 8 is a view showing a modified form of the tool employed for reaming or routing out elongated or oblong holes;

Figure 9 is an inverted isometric view of the combination wedge and cutting member associated with this form of the invention for expanding the bit;

Figure 10 is an isometric view showing a structural member with an oblong hole therein and also showing the oblong hole after it has been routed out with my modified form of routing tool.

Referring more specifically to the drawings, the numeral 10 indicates a suitable shaft having a suitable portion 11 of any desired shape for fitting any suitable chuck structure. The portion 10 has a slot 12 therein which is penetrated transversely by screws 13 and 14. The outer portion of member 10 has a pair of spiral grooves 15 and 16 therein to allow cut-away shavings and dust to be delivered to the exterior of the piece of material being operated upon.

Stored within slot 12 is an expansible bit 18 having a hole 19 therein adapted to be penetrated by screw 13 and also having an enlarged cavity 20 therein forming slender bifurcated portions 21 and 22 to give the desired resiliency and expansibility to expansible bit 18. The expansible bit 18 has cam surfaces 23 and 24 and also has cutting edges 25 and 26. The angularity of these cutting edges 25 and 26 and the particular shape thereof can be changed without departing from the spirit of the invention in order to provide any suitably shaped cavity which may be desired to be routed from an ordinary hole having parallel sidewalls. Disposed between the cam surfaces 23 and 24 is a wedge member 30 having an elongated slot 31 therein, adapted to be penetrated by the screw 14 which loosely holds it in place. The lower portion of member 30 has a substantially disk-like portion 32 from which projects on the lower side thereof, a pointed portion 33 for forming a hole in a bottom of a cavity to be routed out to prevent lateral displacement of the tool. The disk-like portion 32 has opposed cutting edges 37 in its periphery. The natural resiliency of the prongs 21 and 22 of the bit 18 normally push the wedge member 30 downwardly to the position shown in Figures 1 and 2. When the reaming or cutting tool is inserted in a hole 34 in structural member 38 for routing out the same, longitudinal inward pressure is applied to the tool which causes the point 33 to sink into the bottom of the hole and form a cavity therein. At the same time the cam surfaces 35 and 36 of member 30 slidably engage the cam surfaces 23 and 24 and spread the portions 21 and 22 apart from each other in proportion to the amount of longitudinal pressure applied to member 10, and, therefore, form the conically shaped cavity 34a, substantially of the shape as shown in the two left-hand illustrations in Figure 5.

After the cavity has been formed a suitable wedge 40 may be dropped into the bottom of the cavity with the open end of the cavity being disposed upwardly. This wedge has a plurality of wedge-like vanes 41 and a central conical portion 42 so that this conical portion exerts an outward pressure on the four quarters of a rung 44 which may be inserted in the hole to be driven home. The wedge will enter the end of the rung and the vanes will divide it into four sections and the conical portion 42 will force these sections outwardly in cooperation with the wedge-like shape of the wings or vanes 41 and therefore completely fill the routed out cavity as shown in Figure 6.

In some instances, it might be desirable to make a joint wherein an oblong or rectangular hole will be employed. In Figures 8, 9 and 10, a modified form of this tool is shown which can be used to ream such holes. All that is necessary would be to omit the pointed portion 33 from the member 32. I have, therefore, provided an expanding member 30a having a disk 32a the lower surface of which is smooth. The other portions of this cam member 30a are identical to the structure shown in Figure 4, and like reference characters with prime notations added thereto will be employed. In this form of the invention, a structural member 45 may have an oblong hole 46 formed therein and then the tool as shown in Figure 8 may be inserted therein and moved along its interior with lateral as well as longitudinal pressure being applied thereto to form an underreamed hole 46a as shown in the left-hand portions of Figures 8 and 10.

In the drawings and specification, there has been set forth a preferred embodiment of the invention, and although specific terms are employed, they are used in a generic and descriptive sense only, and not for purposes of limitation, the scope of the invention being set forth in the appended claim.

I claim:

An underreaming tool comprising a shank having a longitudinally disposed slot bisecting the lower end thereof, a forked resilient cutting blade made of one piece of spring steel and disposed in said slot and having its upper end secured to the shank and having opposed outwardly flaring cutting edges on the outer edge of the lower end of each fork, the resiliency of the cutting blade causing the cutting edges to be normally disposed within the confines of the shank, and a cam member disposed in the open end of the slot in the forked cutting blade normally projecting beyond the end of the shank and having a longitudinally extending slot therein, a pin mounted in the shank and penetrating the slot in the cam member whereby the cam member is slidably mounted in said slot between the lower ends of the two legs of the cutting blade, so that when said tool is inserted into a hole and inward pressure is applied thereto while the tool is being rotated, the cam member will spread the legs of the blade outwardly from the shank to project beyond the confines of the shank and cut away the sidewalls of the hole at its base to a greater degree than the entrance portion of the hole.

WILLIAM L. MARSHALL.